United States Patent [19]

Layton

[11] 4,306,328
[45] Dec. 22, 1981

[54] WIPER APPARATUS

[76] Inventor: Vestie V. Layton, 1337 E. Orangeburg Ave., Modesto, Calif. 95355

[21] Appl. No.: 119,879

[22] Filed: Feb. 8, 1980

[51] Int. Cl.³ .............................. B60S 1/26; B60S 1/44
[52] U.S. Cl. ................................. 15/250 B; 15/250.24
[58] Field of Search ........... 15/250.24, 250.25, 250 A, 15/250 B

[56] References Cited

U.S. PATENT DOCUMENTS

| 1,490,616 | 4/1924 | Lindquist | 15/250.24 |
| 1,672,136 | 6/1928 | Scott | 15/250.24 |
| 3,289,237 | 12/1966 | Lindsey | 15/250.24 |
| 3,685,087 | 8/1972 | Pittman | 15/250 B |

FOREIGN PATENT DOCUMENTS 353052  7/1931  United Kingdom ............. 15/250.24

Primary Examiner—Peter Feldman
Attorney, Agent, or Firm—Blair, Brown & Kreten

[57] ABSTRACT

A wiper for a mirror such as the side view mirror on a truck or the like including a mirror mounted in a frame with a pair of chains and sprocket assemblies drivably positioned in said frame on opposite sides of the mirror and a wiper blade connected at opposite ends to the chains, the chains being driven in unison by an electric motor to move the wiper blades successively across the face of the mirror in wiping engagement therewith and behind the mirror back to a position for repeating the wiping engagement with the mirror face.

4 Claims, 5 Drawing Figures

WIPER APPARATUS

BACKGROUND OF THE INVENTION

One of the basic problems confronting drivers of vehicles equipped with glass surfaces exposed to ambient weather conditions is removal of the accumulation of dust and grime, and the elimination of the effects of a heavy downpour of rain and other weather conditions which obscure the vision of the vehicle driver. One of the glass surfaces which require the removal of accumulated grime and other foreign matter is the sideview mirror mounted externally on vehicles. On commercial trucks, recreational vehicles, and alike, such sideview mirrors are of considerable size so as to enable the driver of the truck or similar vehicles to observe other vehicles when changing lanes and to permit the driver to back up the vehicle particularly in tight parking spaces.

It has been proposed to provide such sideview mirrors with suitable mechanism usually in the form of wiper blades for clearing the mirror thereby eliminating the undesirable safety conditions which result from the obscuring of the drivers side vision when the sideview mirror is unclear. However, such present day wiper assemblies have been quite complicated in construction thereby interfering with the driver's vision when not in use. Furthermore the complexity of such present day wiper construction has not only resulted in a high inital cost but frequently been costly from the standpoint of maintenance and unexpected breakdown during use. Furthermore, such side view mirrors are frequently of various configurations necessitating a special design of wiper assembly for each specific mirror design adding further to the cost and maintenance of such present day wiper assemblies.

SUMMARY AND OBJECTS OF THE INVENTION

Accordingly, a primary object of this invention is to provide a new and novel wiper assembly for a glass surface on a motor vehicle such as the sideview mirror on a truck or the like for maintaining the mirror surface in a clear condition.

Another object of this invention is to provide a new and novel wiper assembly for a sideview mirror on a truck or the like which operates in a simple and easy manner to continuously clean the mirror surface in a highly efficient manner under any adverse weather conditions such as snow, ice, roadgrime and the like.

A further object of this invention is to provide a new and novel wiper assembly for the sideview mirror of a truck or the like which is simple and inexpensive in construction, which does not obscure the drivers vision when not in use and which is capable of long use without breakdown.

The objects of the invention and other related objects are accomplished by providing a frame arranged to be mounted on the vehicle in which is disposed a mirror having a front surface, a rear surface, side edges and top and bottom edges. At least one chain and sprocket assembly and preferably two are mounted on the frame adjacent each side edge of the mirror and a wiper blade is connected at each end to a respective one of the chains of such assemblies. Drive means are mounted on the frame for continuously advancing the chains in unison to move the wiper blades successively and repeatedly from the mirror top edge to the bottom edge in wiping engagement with the front surface of the mirror and from the bottom edge to the top edge behind the mirror adjacent the rear surface.

The invention will be better understood as well as further objects and advantages thereof will become more apparent from the ensuing detailed description of the preferred embodiment taken in conjunction with the drawings.

DESCRIPTION OF THE PREFERRED EMBODIMENT

Figure 1:
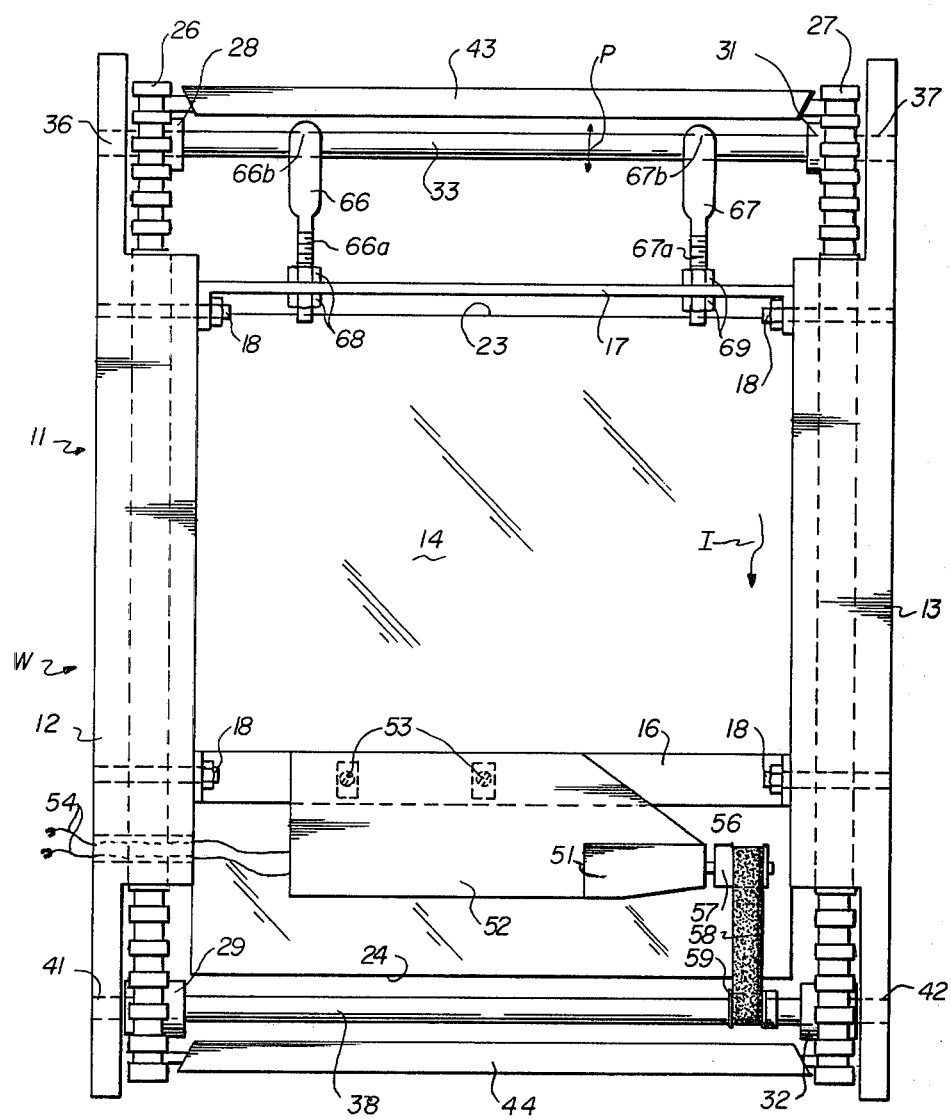
FIG. 1 is a front elevation view of the wiper apparatus of the invention.

Referring now to the drawings and to FIG. 1 in particular, there is shown a wiper apparatus constructed in accordance with the invention for a sideview mirror of a truck or the like which is designated generally by the letter W. The wiper apparatus W of FIG. 1 includes a frame 11 including a pair of side frame members 12, 13 arranged in spaced-apart relationship and suitably mounted therebetween a glass surface such as a mirror 14. In the illustrated embodiment, the side frame member 12, 13 are maintained in a spaced-apart relation by means of cross frame members 16, 17 suitably connected at opposite ends to the side frame member 12, 13 by means such as bolts 18.

Figure 2:
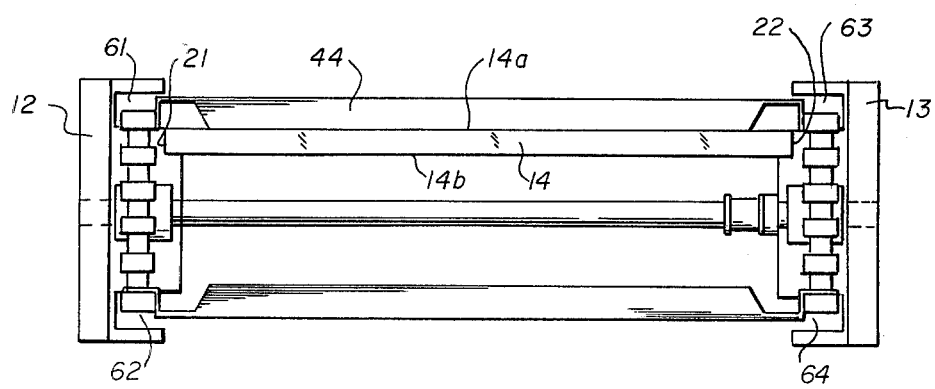
FIG. 2 is an end view of the wiper apparatus of FIG. 1.
Figure 3:
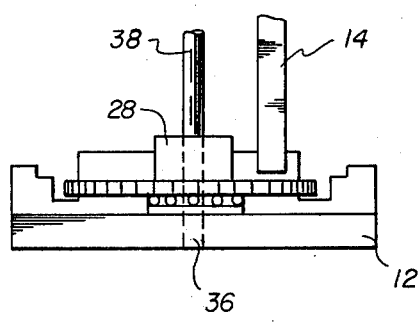
FIG. 3 is an enlarged view of a portion of the wiper apparatus of FIG. 1.
Figure 4:
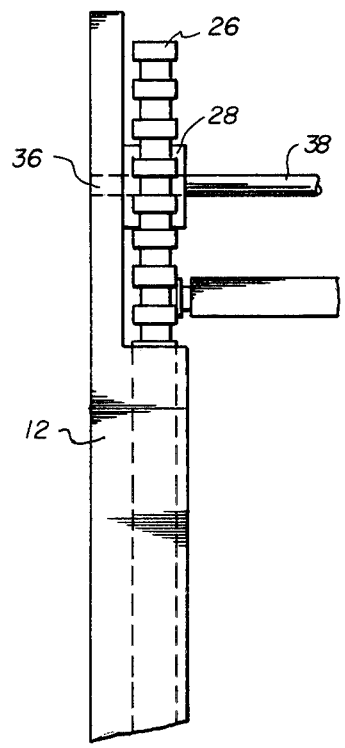
FIG. 4 is an enlarged view of the portion of the apparatus shown in FIG. 3 as viewed from another direction.
Figure 5:
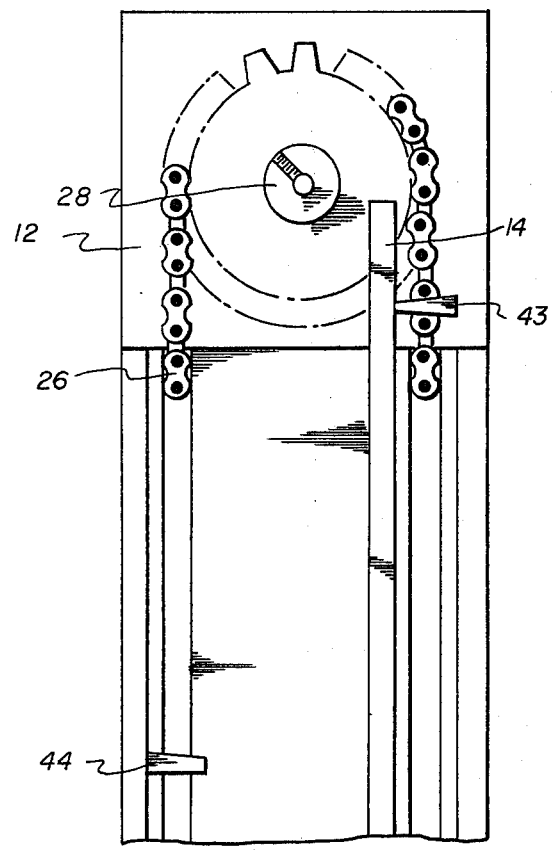
FIG. 5 is a side view of a portion of the apparatus of FIG. 1.

The mirror 14 includes a front surface 14a forming a reflective surface and rear surface 14b as shown best in FIG. 2. The mirror also includes side edges 21, 22 and top and bottom edges 23, 24 as shown best in FIG. 1. At least one and preferably two endless flexible members are provided adjacent a respective side edge 21, 22 of the mirror 14. In the illustrated embodiment, two of such flexible members are provided comprising continuous chains 26, 27 adjacent the side edges 21, 22 of the mirror respectively with each of the chains 26, 27 being provided with a pair of sprockets 28, 29 and 31, 32 respectively forming a pair of chain and sprocket assemblies. The oppositely disposed sprockets 28, 31 in the sprocket pairs are suitably mounted on a shaft 33 extending between the frame side members 12, 13 with the ends of the shaft 33 suitably journaled at 36, 37 in the side frame members 12, 13 respectively adjacent the top edge 23 of the mirror 14. The other sprockets 29, 32 in the sprocket pairs are similarly mounted on a shaft 38 extending between the side frame member 12, 13 adjacent the bottom edge 24 of the mirror 14 with the shaft ends suitably journaled at 41, 42 in the side frame members 12, 13 respectively.

At least one but preferably two wiper blades 43, 44 are suitably connected at opposite ends to the chains 26, 27 so as to extend across the mirror 14 between the side edges 21, 22 in substantially parallel relationship with the sprocket shafts 33, 38. The wiper blades 43, 44 are connected to the chains 26, 27 at locations spaced from each other so that the blades pass each other on the respective front and rear surfaces 14a, 14b of the mirror 14 at approximately a point intermediate the top and bottom edges 33, 34 of the mirror 14. The wiper apparatus W includes drive means for driving the chains 26, 27 in unison in the direction of the arrow I to move each of the wiper blades 43, 44 successively and repeatedly in wiping engagement with the front surface 14a of the mirror 14. Most specifically, the drive means includes a motor, preferably a D.C. motor 51 suitably supported on a bracket 52 mounted by means such as screws 53 to the cross frame member 16 as shown in FIG. 1. The motor 51 is made to be connected to an associated source of power by means of conductors 54 and includes an output shaft 56 having a pulley 57 mounted thereon. The pulley 57 is drivably connected by means such as a belt 58 to a pulley 59 mounted on the shaft 38. Thus, energization of the motor 51 rotates the shaft 38 through the belt and pulley assembly 57-59 so that the sprockets 29, 32 are driven to advance the chains 26, 27 in direction of the arrow I. Thus, the sprockets 28, 31 are either rotating freely during the advance of the chains 26, 27.

Means are provided for guiding the chains 26, 27 as they are advanced between the shafts 33, 38 on opposite sides of the mirror 14. Most specifically, the side frame member 12, 13 are provided with inwardly extending rails 61, 62 and 63, 64 adjacent the top and bottom edges respectively which guideably receive the portions of the chains extending between the sprockets and each pair of rails during the advance of the chains.

The wiper apparatus W of the invention also includes means for adjusting the tension of the chains 26, 27. Most specifically, the ends of the shaft 33 are journaled at 36, 37 and suitably mounted on slots to permit the shaft 33 to move freely in the direction of the double arrow P as shown in FIG. 1. At least one and preferably two laterally spaced arms 66, 67 are provided which are in laterally spaced relationship as shown in FIG. 1 for engagement with the rod 33. The arms 66, 67 are provided with threaded portions 66a, 67a at one end which threadedly engage suitably threaded apertures in the cross frame 17 the opposite ends of the arm 66, 67 being provided with apertures 66b, 67b respectively for rotatably accommodating the shaft 33. Thus, the arms 66, 67 are extended outwardly from the cross frame 17 to move the shaft 33 in upper direction indicated by the double P until the desired tension in the chains 26, 27 is obtained. Subsequently, the arms 66, 67 are maintained in the adjusted position by a means such as lock-washers 68, 69 respectively.

In the operation of the invention, the motor 51 is energized to rotate shaft 38 through the belt and pulley arrangement advancing the chains 26, 27 in the direction of the arrow I in unison. Each wiper blade such as wiper blade 43 moves downwardly with the chains in the direction of the arrow I in wiping engagement with the front surface 14a of the mirror 14. When the wiper blade 43 has completed its stroke cleaning the surface 14a of the mirror 14 the other wiper blade 44 which has been simultaneously moving upwardly in a direction opposite the arrow I behind the mirror 14 adjacent the rear 14b has reached the position formally occupied by the wiper blade 43 so that continuous advance of the chains 26, 27 permits wiper 44 to begin its cleaning action on the mirror front surface 14a. Thus, the wiper blades 43, 44 successively and repeatedly clean the mirror 14a in a highly efficient manner, and can be operated by DC and/or Air and can be chain or belt driven.

What is claimed is:

1. A wiper for cleaning a glass surface such as a vehicle exterior mirror comprising, in combination, a frame, a sheet of glass having a reflective front surface, a rear surface, side edges and top and bottom edges mounted in said frame, a pair of endless flexible members are provided each disposed adjacent one of said glass sheet side edges in oppositely disposed relationship and wherein said wiper blade is connected at each end to a respective one of said flexible members, drive means on said frame for continuously advancing said flexible members in unison to move said wiper blade successively and repeatedly from said glass top edge to said bottom edge in wiping engagement with said front surface and from said bottom edge to said top edge behind said glass sheet adjacent said rear surface, wherein each of said flexible members comprises a chain and wherein said drive means include a pair of sprockets for drivably supporting each of said chains disposed adjacent the top and bottom edges respectively of said glass sheet, said drive means further includes a first shaft rotatably mounted on said frame adjacent said bottom edge of said glass sheet and wherein one of said sprockets in each of said pair of sprockets is mounted adjacent a respective end of said first shaft, an electric motor mounted on said frame drivably connected to said first shaft, a second shaft rotatably mounted on said frame adjacent said top edge of said glass sheet in parallel spaced-apart relationship with said first shaft and wherein the other of said sprockets in each of said pair of sprockets is mounted adjacent a respective end of said second shaft, a cross member mounted on said frame in substantially parallel, spaced-apart relationship with said second shaft, at least one arm member threadedly engagable at one end with said cross member in a selected axial position, the other end of said arm member being provided with an aperture for rotatably accommodating said second shaft and means for releasably securing said one end of said arm member in said selected axial position.

2. A wiper in accordance with claim 1 including a further wiper blade connected at opposite ends to said chains, said wiper blades being connected to said chains at locations spaced from each other so as to pass each other on the respective front and rear surfaces of said glass sheet approximately at a point intermediate the top and bottom edges of said glass sheets.

3. A wiper in accordance with claim 2 wherein said second shaft is mounted on said frame for slidably adjusting said spaced-apart relationship with said first shaft to maintain the desired degree of tension in said chains and including means for adjustably maintaining said second shaft in a selected spaced-apart relationship with said first shaft.

4. A wiper in accordance with claim 6 including guide means on said frame associated with each of said chains for guidably supporting said chains between said pair of sprockets .

* * * * *